(12) United States Patent
Perrella et al.

(10) Patent No.: US 6,943,296 B2
(45) Date of Patent: Sep. 13, 2005

(54) USB WALL PLATE

(75) Inventors: Ronald Perrella, Atlanta, GA (US); Barrett Kreiner, Norcross, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 11 days.

(21) Appl. No.: 10/726,356

(22) Filed: Dec. 3, 2003

(65) Prior Publication Data

US 2005/0121220 A1 Jun. 9, 2005

(51) Int. Cl.[7] .............................................. H05K 5/03
(52) U.S. Cl. ..................... 174/66; 174/67; 220/241; 220/242; 439/536
(58) Field of Search ................ 174/66, 67, 53, 174/57, 135, 17 CT; 220/3.2, 3.3, 241, 242, 220/3.8; 702/250; 439/536; D13/156

(56) References Cited

U.S. PATENT DOCUMENTS

| | | | |
|---|---|---|---|
| 3,432,611 A * | 3/1969 | Gaines et al. ................. | 174/66 |
| 5,485,356 A * | 1/1996 | Nguyen ....................... | 174/66 |
| 5,735,708 A * | 4/1998 | Arnett et al. ................. | 174/66 |
| 5,841,424 A * | 11/1998 | Kikinis ....................... | 345/168 |
| 6,050,849 A * | 4/2000 | Chang ........................ | 439/536 |
| 6,222,124 B1 * | 4/2001 | Pritchard et al. ............. | 174/66 |
| 6,281,438 B1 | 8/2001 | Desilets et al. | |
| 6,421,941 B1 * | 7/2002 | Finke et al. | |
| 6,466,434 B1 * | 10/2002 | Tsai ........................... | 361/685 |
| 6,491,541 B2 * | 12/2002 | Wakino ....................... | 439/451 |
| 6,541,879 B1 | 4/2003 | Wright | |
| 6,560,102 B1 | 5/2003 | Tong et al. | |
| 6,563,714 B2 * | 5/2003 | Chang ........................ | 361/752 |
| 6,566,602 B1 * | 5/2003 | Miller et al. ................. | 174/66 |
| 6,611,552 B2 | 8/2003 | Beck | |
| 6,722,917 B2 * | 4/2004 | Huang ........................ | 439/501 |
| 6,723,922 B1 * | 4/2004 | Shotey et al. ................ | 174/66 |
| 6,843,681 B2 * | 1/2005 | Sanner ....................... | 439/536 |
| 6,880,020 B1 * | 4/2005 | Rubinstein et al. .......... | 709/250 |
| 2004/0076048 A1 * | 4/2004 | Kabenjian et al. | |

OTHER PUBLICATIONS

DataPro P/N 80-3084: USB Wall Plate, available on Sep. 3, 2003 at, http://www.datapro.net/products/80-3084.html.

DataPro P/N 80-3033: USB Face Plate x2, available on Sep. 3, 2003 at http://www.datapro.net/products/80-3033.html.

* cited by examiner

*Primary Examiner*—Dean A. Reichard
*Assistant Examiner*—Angel R. Estrada
(74) *Attorney, Agent, or Firm*—Potomac Patent Group PLLC

(57) ABSTRACT

A USB wall plate is disclosed. The USB wall plate includes a first surface, a second surface opposite the first surface, and four side edges connected to the first and second surfaces. The wall plate defines a first opening and a second opening. The first opening extends from the first surface to the second surface and is adapted to receive a USB connector. The second opening extends from the first surface to the second surface and is adapted to receive an indicating light.

20 Claims, 5 Drawing Sheets

USB WALL PLATE

BACKGROUND

The present application is related, generally and in various embodiments, to a wall plate. In many institutions, businesses and residences, one or more devices compliant with the Universal Serial Bus (USB) 2.0 standard are connected to a single computer. For example, in some systems one or more USB compliant devices such as a keypad, a mouse, a webcam, a digital camera, a modem, a storage device, a printer and speakers are connected to the computer.

Although the USB 2.0 standard allows for up to 127 USB devices to be connected to a single computer, many computers are configured to only have relatively few USB devices connected directly thereto. When the number of USB devices to be connected directly to a computer exceeds the number of USB ports at the computer, a USB hub connected to a USB port at the computer can be used to increase the number of USB devices that can be connected to the computer. A typical USB hub allows for two or four additional USB devices to be connected to the computer via the USB hub, and two or more USB hubs can be connected together to increase the number of USB devices that can be connected to the computer.

As the number of USB devices connected to a computer increases, the USB cables associated with the USB devices often cause the area proximate the computer to appear relatively cluttered and unsightly. In addition, when one or more USB hubs are used to accommodate the number of USB devices to be connected to the computer, the location of the one or more USB hubs often reduces the amount of available work space proximate the computer. For USB hubs that require an external source of power, the power cord connected to the USB hub often causes the area proximate the computer to appear even more cluttered and unsightly.

SUMMARY

In one general respect, this application discloses embodiments of a USB wall plate. According to various embodiments, the USB wall plate includes a first surface, a second surface opposite the first surface, and four side edges connected to the first and second surfaces. The wall plate defines a first opening and a second opening. The first opening extends from the first surface to the second surface and is adapted to receive a USB connector. The second opening extends from the first surface to the second surface and is adapted to receive an indicating light.

According to other embodiments, the USB wall plate includes a first surface, a second surface opposite the first surface, four side edges connected to the first and second surfaces, and a printed circuit board having a USB hub circuit connected thereto. The printed circuit board is connected to the second surface.

Other embodiments of the disclosed invention will be or become apparent to one skilled in the art upon review of the following drawings and detailed description. It is intended that all such additional embodiments be included within this description, be within the scope of the disclosed invention, and be protected by the accompanying claims.

DETAILED DESCRIPTION

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

Figure 1:
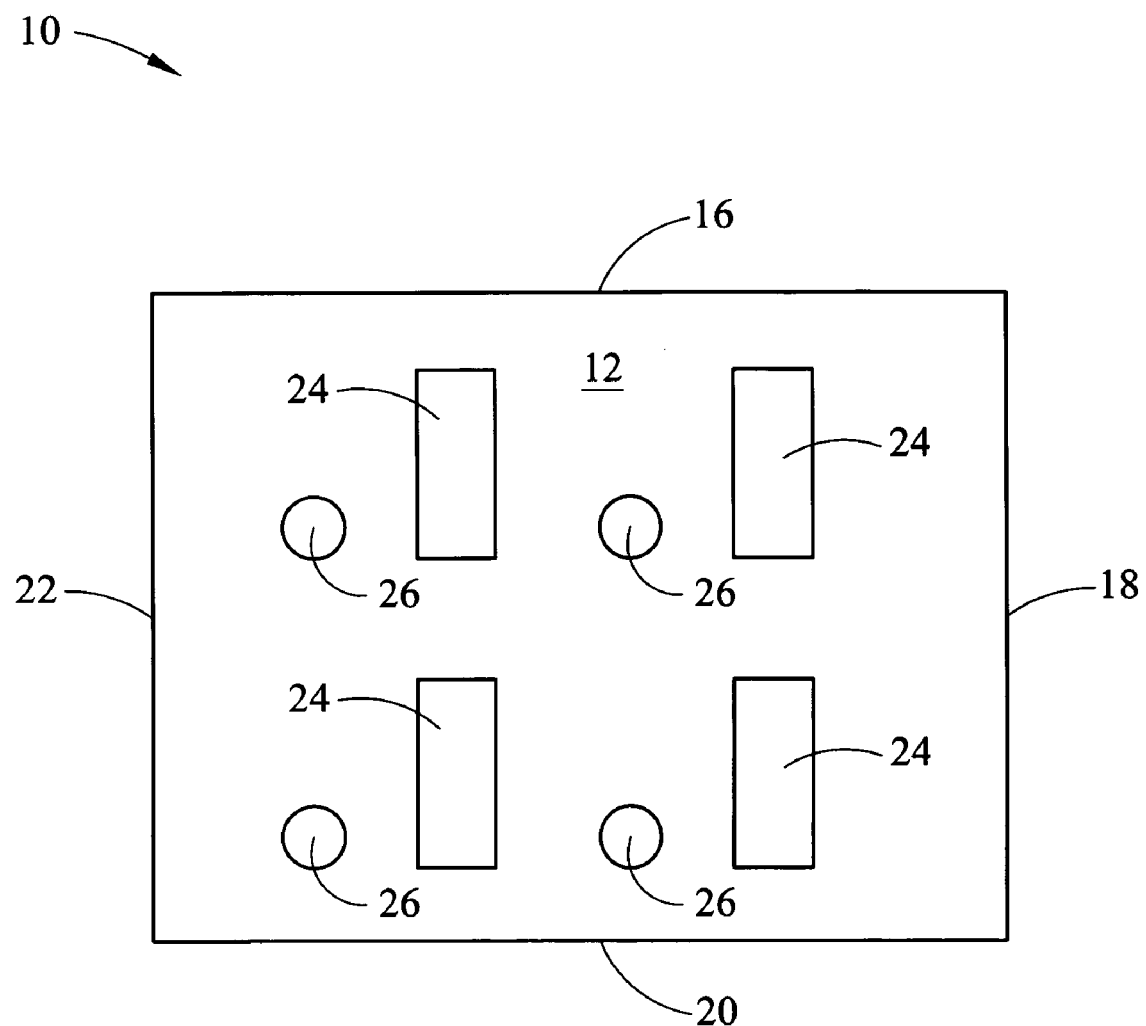
FIG. 1 illustrates a USB wall plate according to various embodiments.
Figure 2:
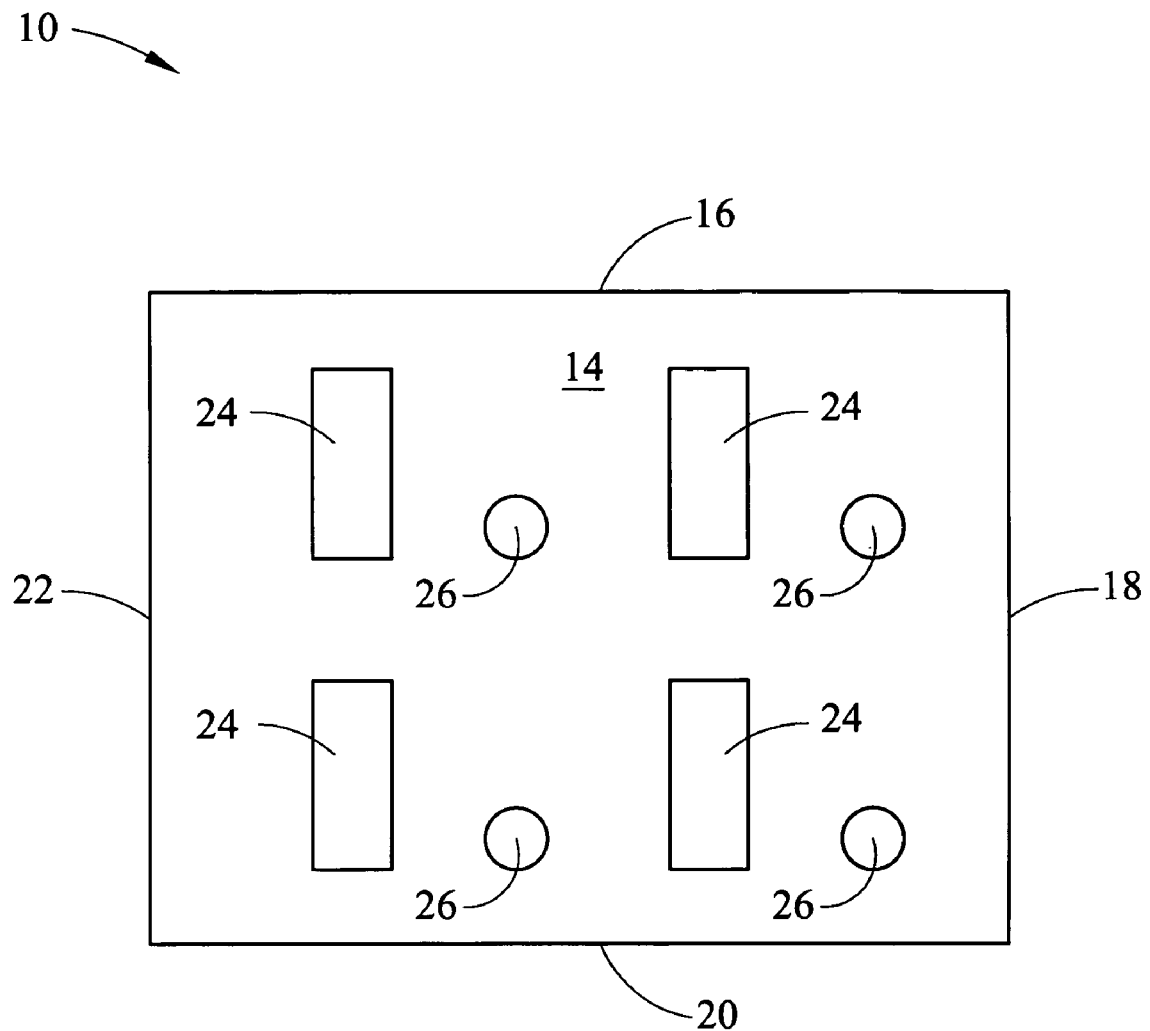
FIG. 2 illustrates another view of the USB wall plate of FIG. 1 according to various embodiments.
Figure 3:
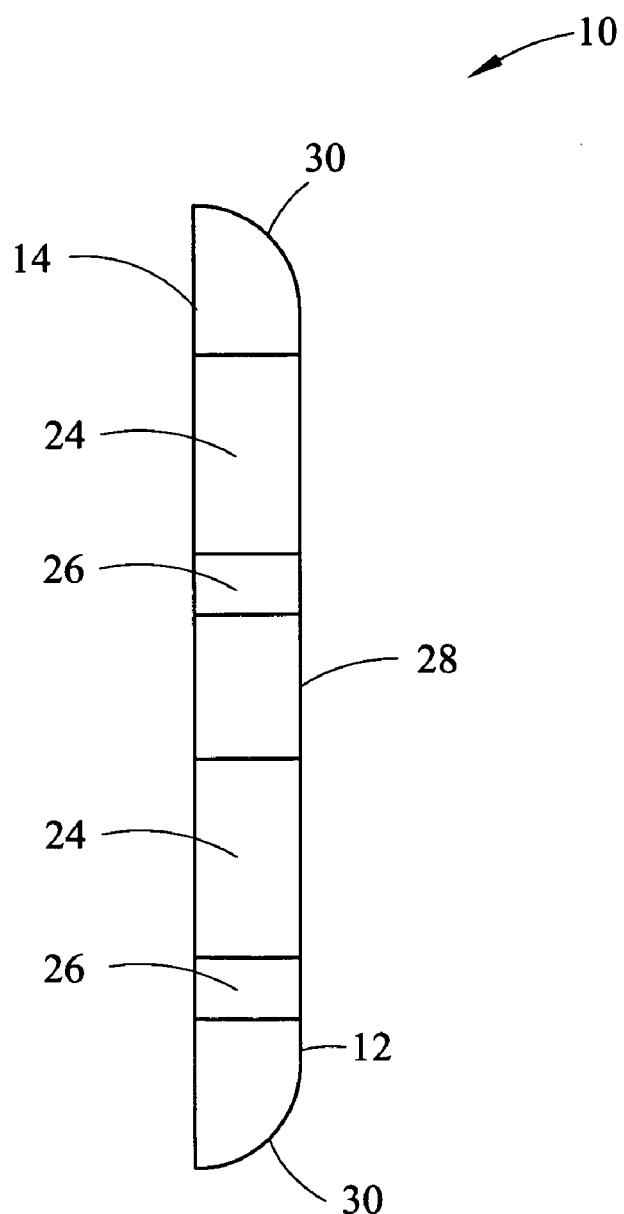
FIG. 3 illustrates another view of the USB wall plate of FIG. 1 according to various embodiments.

FIGS. 1–3 illustrate various embodiments of a USB wall plate 10. The wall plate 10 is fabricated from an insulating material. The wall plate 10 includes a first surface 12 and a second surface 14 opposite the first surface 12. The wall plate 10 also includes a first side edge 16, a second side edge 18, a third side edge 20 and a fourth side edge 22 connected to the first and second surfaces 12, 14. The second side edge 18 is adjacent the first side edge 16. The third side edge 20 is adjacent the second side edge 18 and opposite the first side edge 16. The fourth side edge 22 is adjacent the first and third side edges 16, 20 and opposite the second side edge 18.

The wall plate 10 defines a first opening 24 and a second opening 26. The first opening 24 is a rectangular-shaped opening and the second opening 26 is a circular-shaped opening. As shown in FIGS. 1–2, the wall plate 10 defines four first openings 24 and four second openings 26 according to various embodiments. For each first opening 24 defined by the wall plate 10, the wall plate 10 also defines a second opening 26 proximate to and associated with the respective first opening 24. According to other embodiments, the wall plate 10 defines more than four first openings 24 and more than four associated second openings 26. According to yet other embodiments, the wall plate 10 defines less than four first openings 24 and less than four associated second openings 26.

As shown in FIG. 3, the first surface 12 includes a planar portion 28 and a curved or tapered portion 30. The curved or tapered portion 30 of the first surface 12 is proximate the first side edge 16, the second side edge 18, the third side edge 20 and the fourth side edge 22. The first opening 24 extends from the first surface 12 to the second surface 14 and the second opening 26 extends from the first surface 12 to the second surface 14.

Figure 4:
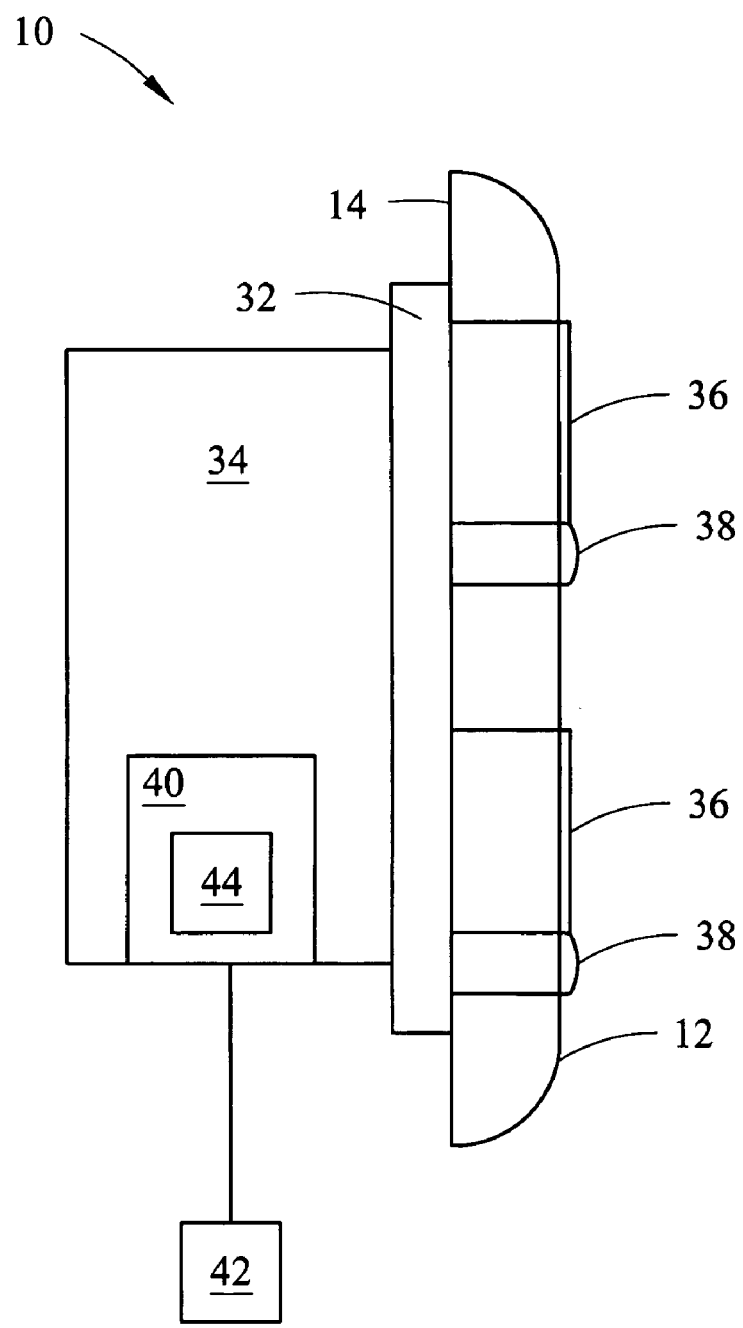
FIG. 4 illustrates a USB wall plate according to various embodiments.

According to various embodiments, the USB wall plate 10 further includes, as shown in FIG. 4, a printed circuit board 32 having a USB hub circuit 34 connected thereto. The printed circuit board 32 is connected to the second surface 14. The USB hub circuit 34 includes a plurality of USB connectors 36. According to various embodiments, the USB hub circuit 34 includes an upstream USB connector and four downstream USB connectors, and each of the four downstream USB connectors 36 extends through a separate one of the four first openings 24 defined by the wall plate 10. Thus, each of the first openings 24 is adapted to receive a USB connector 36. The USB hub circuit 34 also includes a plurality of indicating lights 38. Each indicating light 38 is a light emitting diode and is associated with a particular USB connector 36. According to various embodiments, the USB hub circuit 34 includes four indicating lights 38, and each of the four indicating lights 38 extends through a separate one of the four second openings 26 defined by the wall plate 10. Thus, each of the second openings 26 is adapted to receive an indicating light 38. The USB hub circuit 34 also includes a power supply 40 configured for connection to an external power source 42. The power supply 40 includes a transformer 44. The wall plate 10 serves as a powered USB hub when the power supply 40 is connected to the external power source 42.

Figure 5:
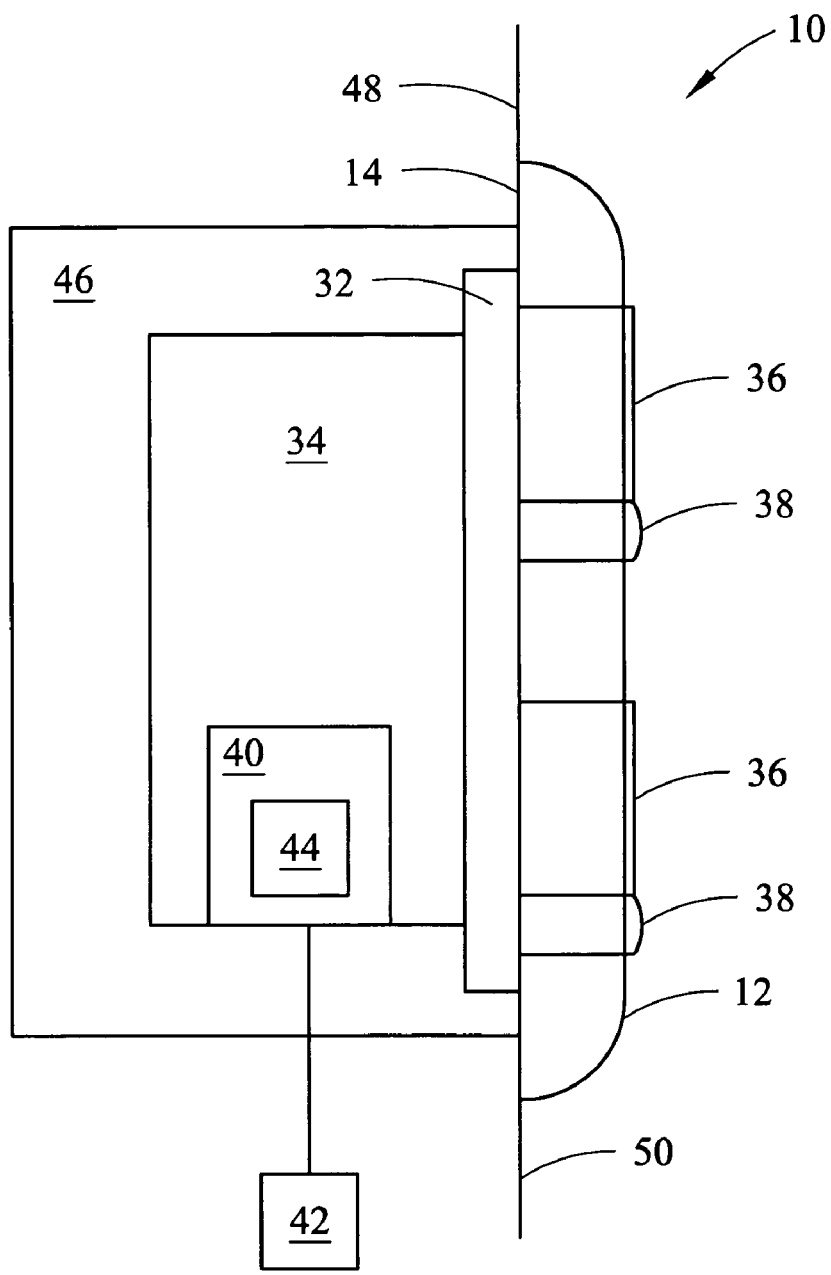
FIG. 5 illustrates the USB wall plate of FIG. 4 installed in an opening of a wall.

FIG. 5 illustrates the wall plate 10 of FIG. 4 installed in an opening 46 of a wall 48. The printed circuit board 32 and portions of the USB hub circuit 34 are recessed into the opening 46 until a portion of the second surface 14 of the wall plate 10 contacts the wall 48 on the room side 50 of the wall 48. When the power supply 40 is connected to the external power source 42 and one or more USB devices are connected to the downstream USB connectors 36, the wall plate 10 serves as a transceiver for transmitting and receiving USB signals (i.e., signals that comply with the USB 2.0 standard). The connection between the power supply 40 and the external power source 42 is not visible from the room side 50 of the wall 48. When a USB device connected to a particular USB connector 36 is powered up or becomes active, the indicating light 38 associated with the USB connector 36 is illuminated and is visible from the room side 50 of the wall 48.

While several embodiments of the disclosed invention have been described, it should be apparent, however, that various modifications, alterations and adaptations to those embodiments may occur to persons skilled in the art with the attainment of some or all of the advantages of the disclosed invention. For example, according to various embodiments, the first surface 12 of the wall plate 10 does not include a curved or tapered portion 30. It is therefore intended to cover all such modifications, alterations and adaptations without departing from the scope and spirit of the disclosed invention as defined by the appended claims.

What is claimed is:

1. A wall plate that is mountable on a wall of a building structure, comprising:
   a first surface;
   a second surface opposite the first surface, wherein a portion of the second surface contacts a side of the building wall when the wall plate is mounted on the building wall;
   four side edges connected to the first and second surfaces; and
   a printed circuit board having a Universal Serial Bus (USB) hub circuit connected thereto, wherein the printed circuit board is connected to the second surface and is recessed in an opening in the building wall when the wall plate is mounted on the building wall.

2. The wall plate of claim 1, wherein the wall plate is fabricated from an insulating material.

3. The wall plate of claim 1, wherein the first surface includes a planar portion.

4. The wall plate of claim 3, wherein the first surface includes a tapered portion.

5. The wall plate of claim 1, wherein the wall plate defines a rectangular-shaped opening extending from the first surface to the second surface.

6. The wall plate of claim 1, wherein the wall plate defines a plurality of rectangular-shaped openings extending from the first surface to the second surface.

7. The wall plate of claim 6, wherein the wall plate defines four rectangular-shaped openings extending from the first surface to the second surface.

8. The wall plate of claim 1, wherein the wall plate defines a circular-shaped opening extending from the first surface to the second surface.

9. The wall plate of claim 1, wherein the wall plate defines a plurality of circular-shaped openings extending from the first surface to the second surface.

10. The wall plate of claim 9, wherein the wall plate defines four circular-shaped openings extending from the first surface to the second surface.

11. The wall plate of claim 1, wherein the USB hub circuit includes a plurality of USB connectors.

12. The wall plate of claim 11, wherein the USB hub circuit includes an upstream USB connector and four downstream USB connectors.

13. The wall plate of claim 12, wherein each of the four downstream USB connectors extends through openings defined by the wall plate.

14. The wall plate of claim 1, wherein the USB hub circuit includes a plurality of indicating lights.

15. The wall plate of claim 14, wherein the USB hub circuit includes four indicating lights.

16. The wall plate of claim 14, wherein each of the four indicating lights extends through openings defined by the wall plate.

17. The wall plate of claim 1, wherein the USB hub circuit includes:
   a downstream USB connector that extends through a first opening defined by the wall plate; and
   an indicating light associated with the downstream USB connector, wherein the indicating light extends through a second opening defined by the wall plate.

18. The wall plate of claim 17, wherein the USB hub circuit includes a plurality of downstream USB connectors and a plurality of associated indicating lights.

19. The wall plate of claim 1, wherein the USB hub circuit includes a power supply.

20. The wall plate of claim 19, wherein the power supply includes a transformer.

* * * * *